United States Patent
Nielsen et al.

(10) Patent No.: US 11,415,104 B2
(45) Date of Patent: Aug. 16, 2022

(54) CONTROL OF A WIND TURBINE

(71) Applicant: VESTAS WIND SYSTEMS A/S, Aarhus N (DK)

(72) Inventors: Anders Steen Nielsen, Højbjerg (DK); Tobias Gybel Hovgaard, Ry (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 92 days.

(21) Appl. No.: 16/545,439

(22) Filed: Aug. 20, 2019

(65) Prior Publication Data

US 2020/0056588 A1    Feb. 20, 2020

(51) Int. Cl.
*F03D 7/04* (2006.01)
*F03D 17/00* (2016.01)
*F03D 7/02* (2006.01)

(52) U.S. Cl.
CPC .......... *F03D 7/045* (2013.01); *F03D 7/0292* (2013.01); *F03D 17/00* (2016.05); *F05B 2270/332* (2013.01); *F05B 2270/335* (2013.01); *F05B 2270/404* (2013.01)

(58) Field of Classification Search
None
See application file for complete search history.

(56) References Cited

U.S. PATENT DOCUMENTS

| 9,599,096 B2* | 3/2017 | Spruce ............... F03D 7/028 |
| 2012/0143565 A1 | 6/2012 | Graham, III et al. |
| 2013/0035798 A1* | 2/2013 | Zhou ................ G06Q 50/06 700/287 |

(Continued)

FOREIGN PATENT DOCUMENTS

| DK | 201570721 A1 | 11/2015 |
| DK | 178737 B1 * | 12/2016 |

(Continued)

OTHER PUBLICATIONS

Danish Patent and Trademark Office 1st Technical Examination for Application No. PA 2018 70538 dated Mar. 1, 2019.

(Continued)

*Primary Examiner* — Jennifer L Norton
(74) *Attorney, Agent, or Firm* — Patterson + Sheridan, LLP (57) ABSTRACT

A control system and method of control are disclosed. A model predictive control, MPC, unit is configured to determine a control signal for controlling an operation of the wind turbine based at least in part on a cost function comprising a wear cost relating to one or more types of wear of the winding turbine, and a corresponding cost weighting, which defines a relative weighting of the wear cost in the cost function. A weighting determination unit is configured to receive a reference signal comprising a target wear, receive a feedback signal comprising a wear measure of the wind turbine, and determine, based at least in part on a difference between the target wear and the wear measure, a weighting adjustment for at least part of the cost weighting of the cost function. The MPC unit then sets the cost weighting based at least in part on the weighting adjustment.

14 Claims, 6 Drawing Sheets

(56) References Cited

U.S. PATENT DOCUMENTS

| | | | |
|---|---|---|---|
| 2013/0147195 A1* | 6/2013 | Krug | F03D 17/00 290/44 |
| 2013/0204447 A1* | 8/2013 | Bjerge | G06Q 10/04 700/287 |
| 2018/0142674 A1 | 5/2018 | Hammerum et al. | |
| 2018/0223808 A1 | 8/2018 | Spruce | |
| 2019/0048849 A1* | 2/2019 | Grunnet | F03D 7/0292 |
| 2020/0025177 A1* | 1/2020 | Redding | F03D 7/00 |
| 2021/0123416 A1* | 4/2021 | Vestergaard | F03D 7/0292 |

FOREIGN PATENT DOCUMENTS

| | | | | |
|---|---|---|---|---|
| EP | 2933477 A1 | 10/2015 | | |
| EP | 3055557 B1 * | 9/2019 | | F03D 7/0224 |
| WO | 2016188532 | 1/2016 | | |
| WO | 2017137050 A1 | 8/2017 | | |

OTHER PUBLICATIONS

European Extended Search Report for Applicaton 19191895.2-1007 dated Dec. 20, 2019.
O'dgaard et al.,"On Using Pareto Optimality to tune a linear model predictive controller for wind turbines," Renewable Energy 87 (2016) 884-891.
Danish Patent and Trademark Office Search Report for Application No. PA 2018 70538 dated Feb. 25, 2019.

* cited by examiner

CONTROL OF A WIND TURBINE

FIELD OF THE INVENTION

The present invention relates to a control system and a method of control for a wind turbine.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

During operation a wind turbine experiences varying climatic conditions and the control system of the wind turbine is designed to take into account these variations.

This constant adaptation to the current conditions imposes a certain and a varying level of fatigue to the wind turbine's components.

Existing wind turbines may include a monitoring system which monitors the operation and determines a number of fatigue measures of various components based on monitored signals, such as vibration signals from sensors. If a too high fatigue level is determined of a given component, the turbine may be shut down or operated in a derated mode until the component can be repaired.

The inventors of the present invention have realized that there is a need for further ways of operating a wind turbine taking fatigue exposure into account during operation of the wind turbine.

SUMMARY OF THE INVENTION

A first aspect of the invention provides a control system for a wind turbine, the control system comprising: a model predictive control, MPC, unit configured to determine a control signal for controlling an operation of the wind turbine, wherein the MPC unit is configured to determine the control signal based at least in part on a cost function comprising a wear cost relating to one or more types of wear of the winding turbine, and a corresponding cost weighting, wherein the cost weighting defines a relative weighting of the wear cost in the cost function; and a weighting determination unit configured to: receive a reference signal comprising a target wear; receive a feedback signal comprising a wear measure of the wind turbine; and determine, based at least in part on a difference between the target wear and the wear measure, a weighting adjustment for at least part of the cost weighting of the cost function; wherein the MPC unit is configured to set the cost weighting based at least in part on the weighting adjustment.

By determining the weighting adjustment based on the difference between the target wear and the wear measure, and then setting the cost weighting in the MPC based on the weighting adjustment, control of the wind turbine may be adjusted to increase or decrease wear during the lifetime of the wind turbine, or during the lifetime of parts/components of the wind turbine (for example, increasing or decreasing the rate of wear from that time onwards). In this way, failure may be controlled to take place closer to the end of the design lifetime, which should reduce servicing time and costs and reduce the potential for periods of turbine downtime caused by early failures. Furthermore, power output over the lifetime of the wind turbine may be improved, since the wind turbine may be driven harder to increase the rate of wear when under-wear has been identified.

The weighting determination unit may be configured to determine the weighting adjustment based at least in part on a magnitude and/or sign of the difference between the target wear and the wear measure.

The wear measure may comprise a first wear measure of the wind turbine and the target wear may comprise a corresponding first target wear.

The weighting determination unit may be configured to determine the weighting adjustment based at least in part on a difference between the first wear measure and the first target wear.

The wear measure may further comprise a second wear measure of the wind turbine and the target wear may further comprise a corresponding second target wear.

The weighting determination unit may be configured to determine the weighting adjustment based at least in part on a difference between the second wear measure and the second target wear.

The weighting determination unit may be configured to determine the weighting adjustment based at least in part on a difference between: a ratio of the first wear measure and the second wear measure; and a ratio of the first target wear and the second target wear.

The weighting determination unit may comprise at least one PI controller configured to determine the weighting adjustment based at least in part on a difference between the target wear and the wear measure.

The wear measure may be based at least in part on an operational state of the wind turbine.

The wear measure may comprise at least one estimated wear of the wind turbine, wherein the control system may further comprise: a wear estimator configured to: receive a current operational state of the wind turbine; and generate the wear measure based at least in part on the current operational state.

The wear measure may comprise a cumulative measure of wear of at least part of the wind turbine.

The MPC unit may be is configured to determine the control signal by optimizing the cost function.

The cost function may comprise one or more constraints for the cost weighting and/or for a power output of the wind turbine.

The control system may be further configured to output a constraint notification to a monitoring entity, wherein the constraint notification is indicative of at least one of the one or more constraints being reached.

The cost function may comprise a plurality of wear costs, each relating to one or more types of wear of the winding turbine, and a corresponding plurality of cost weightings.

The weighting adjustment may comprise a plurality of values corresponding to at least some of the plurality of cost weightings in the cost function.

The target wear may change with respect to time.

A second aspect of the invention provides a wind turbine comprising the control system of the first aspect.

A third aspect of the invention provides a method of controlling an operation of a wind turbine, the method comprising: receiving a reference signal comprising a target wear; receiving a feedback signal comprising a wear measure of the wind turbine;

determining, based at least in part on a difference between the target wear and the wear measure, a weighting adjustment for at least part of a cost weighting of a cost function of a model predictive control, MPC, routine; setting the cost weighting in the cost function of the MPC routine based at least in part on the weighting adjustment; and determining, using the MPC routine, a control signal for controlling the operation of the wind turbine, wherein the MPC routine is configured to determine the control signal based at least in part on the cost function comprising the cost weighting and a corresponding wear cost relating to one or more types of wear of the wind turbine, wherein the cost weighting defines a relative weighting of the wear cost in the cost function.

A fourth aspect of the invention provides a computer program configured to perform the method of the third aspect, when executed on a processor of an electronic device.

BRIEF DESCRIPTION OF THE DRAWINGS

Embodiments of the invention will now be described, by way of example only, with reference to the accompanying drawings, in which.

DETAILED DESCRIPTION OF EMBODIMENT(S)

Wind turbines and parts/components of wind turbines experience wear over their lifetime. A wind turbine and at least some of its parts/components have design lifetimes, at the end of which they are expected to wear out and fail. The inventors have recognised that it is beneficial for failure to take place as close as possible to the design lifetime. Early failure can be very costly, both because of turbine downtime caused by the failure and by emergency, unscheduled maintenance being required. Late failure can mean that the wind turbine could potentially have been driven harder during its lifetime to generate more electrical power. In the present disclosure, at least once during the lifetime of the wind turbine a wear measure for the wind turbine or a part/component of the wind turbine is compared with a target wear for the wind turbine or part/component. This comparison can reveal if under-wear or over-wear has taken place during the life so far of the wind turbine or the part/component. Cost weightings within a model predictive controller (MPC) are then set based on the comparison. The MPC controls at least part of the operation of the wind turbine, so any changes to the cost weightings should change the way in which the wind turbine is controlled from that time onwards. Consequently, if over-wear is identified, the cost weightings in the MPC may be set such that the wind turbine is driven less hard in order to reduce the rate of wear from then on and ensure that early failure does not take place. If under-wear is identified, the cost weightings in the MPC may be set such that the wind turbine may be driven harder to increase power output. As such, the wind turbine may be utilised more effectively, with a lower lifetime cost.

The 'target wear' is indicative of a design or target amount of wear for the wind turbine or a part/component of the wind turbine. It may be indicative of the cumulative amount of wear that the wind turbine or the part/component was designed to have experienced during a defined time period (for example, over the course of its life so far, or over the preceding month, or year, etc). Target wear may take any suitable numerical form depending on the nature of wear to which it relates and/or the part/component to which it relates. For example, it may be a dimensional or dimensionless number indicative of the amount of the amount of wear that the wind turbine or part/component should have experienced, according to its design.

The 'wear measure' is indicative of the wear on the wind turbine, or on a component/part of the wind turbine. It may be indicative of the cumulative wear that the wind turbine or the part/component has experienced during a defined period of time (for example, over the course its life so far, or over the last month, over the last year, etc). Again, it may take any suitable numerical form depending on the nature of wear to which it relates and/or the part/component to which it relates. For example, it may be a dimensional or dimensionless number indicative of the amount of the amount of wear, or an estimate of the amount of wear, that the wind turbine or part/component has actually experienced. The wear measure may be determined in any suitable way, for example from direct sensor measurements of wear and/or based on measurements of fatigue loading and/or an estimates of fatigue loading and/or pitch travel distance (for example, how many degrees of pitch a blade has travelled) and/or the number of times an electrical contactor has been activated (which may be particularly relevant for components of the yaw system and/or generator), etc.

Figure 1:
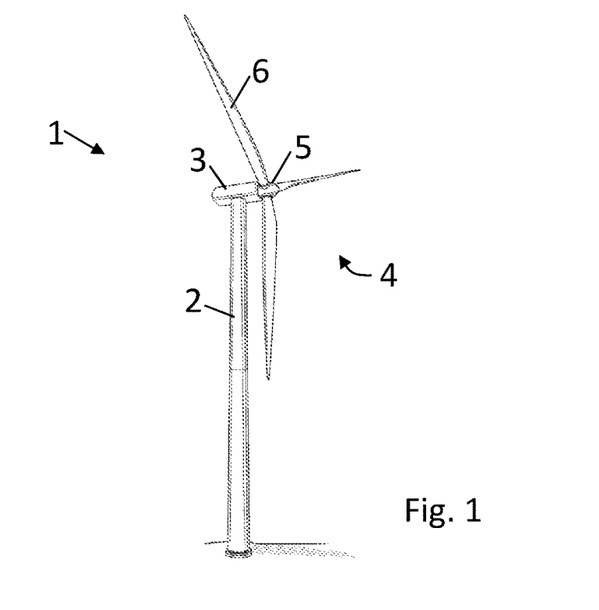
FIG. 1 illustrates an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside the turbine and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
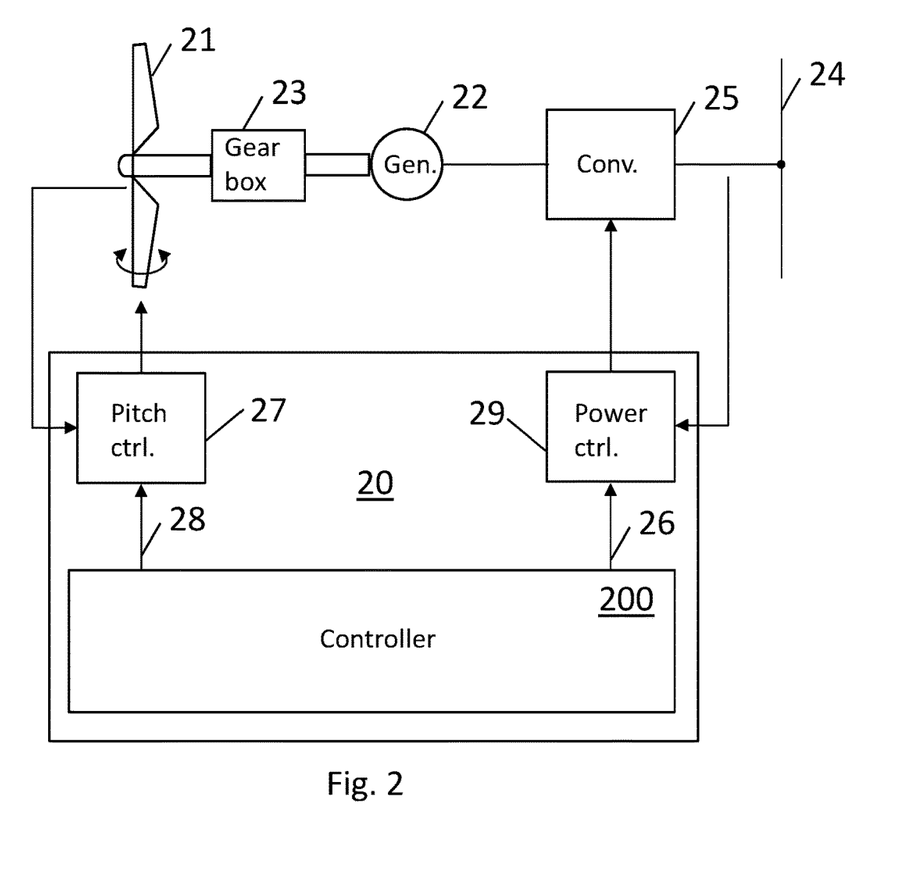
FIG. 2 illustrates an embodiment of a control system together with elements of a wind turbine.

FIG. 2 schematically illustrates an embodiment of a control system 20 together with elements of a wind turbine. The wind turbine comprises rotor blades 21 which are mechanically connected to an electrical generator 22 via gearbox 23. The electrical power generated by the generator 22 is injected into a power grid 24 via an electrical converter 25. The electrical generator 22 can be a doubly fed induction generator, but other generator types may be used. Moreover, a gearbox need not be present.

The control system comprises a number of elements, including at least one controller 200 with a processor and a memory, so that the processor is capable of executing computing tasks based on instructions stored in the memory. In general, the wind turbine controller 200 ensures that in operation the wind turbine generates a requested power output level. This is obtained by adjusting the pitch angle and/or the power extraction of the converter. To this end, the control system 20 comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades.

Figure 3:
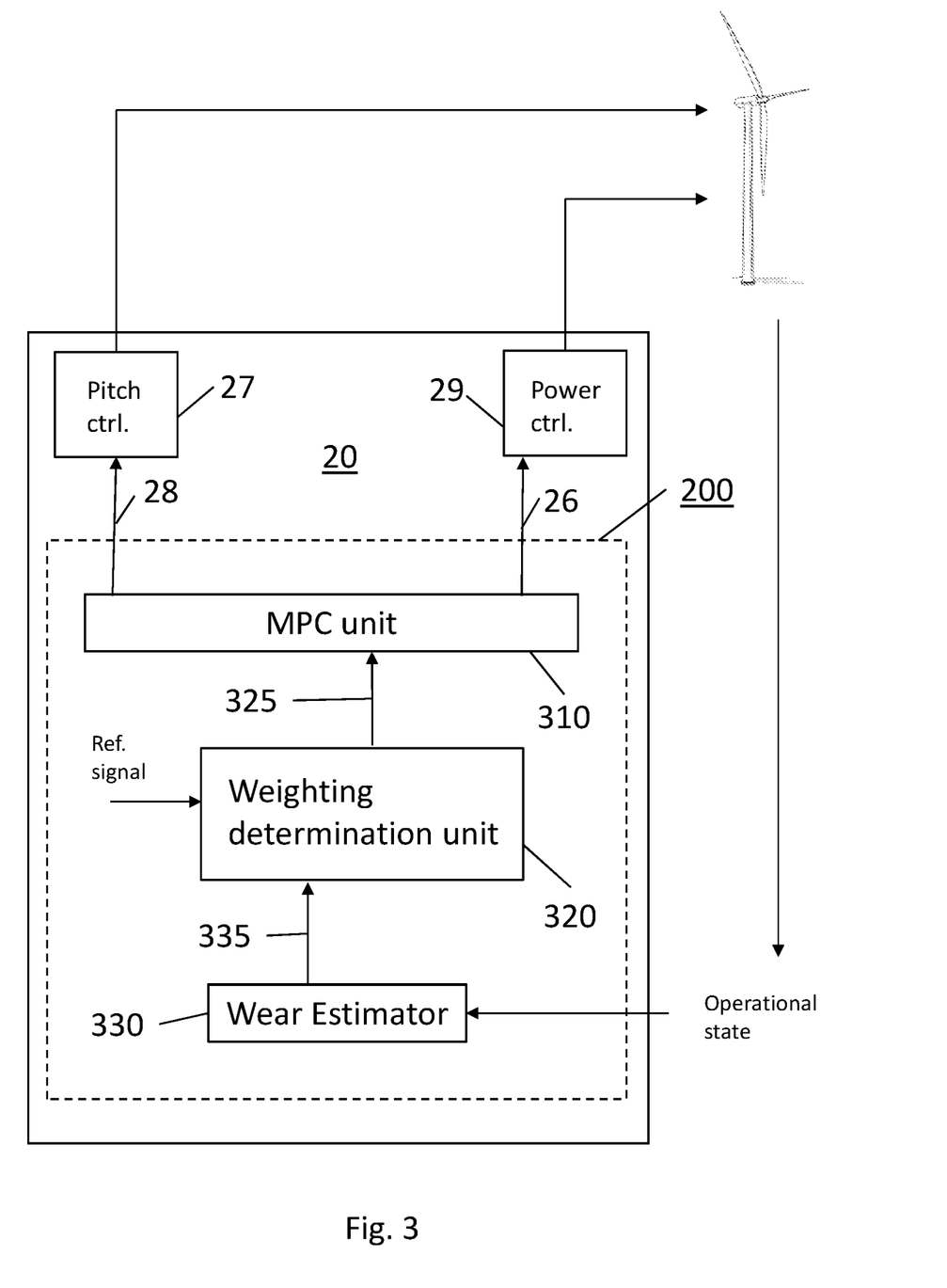
FIG. 3 illustrates details of a controller in the control system of FIG. 2.

FIG. 3 schematically illustrates details of the controller 200 in accordance with an embodiment. The controller 200 comprises a model predictive control, MPC, unit 310, a weighting determination unit 320 and a wear estimator 330. The wear estimator 330 is configured to receive a feedback signal from the wind turbine, the feedback signal comprising an operational state of the wind turbine. The operational state is one or more operational parameters, for example a collection of operational parameters, often expressed as a vector. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, $\theta$, rotor angular speed, $\omega$, and tower top position, s, as well as time derivatives of those parameters. Other and more parameters may be used to define the wind turbine state, $x^*$.

The state values of the current operational state of the wind turbine may be based on measured sensor readings from sensors arranged to measure sensor data relating to the wind turbine's physical state values. Additionally, or alternatively, estimated values or calculated values may also be used. In an embodiment, the state may be determined by a state calculator, e.g. in the form of a dedicated computational unit in charge of determining the current operational state, such as an observer or a Kalman filter.

The wear estimator 330 is configured to generate a wear measure 335 based at least in part on the received current operational state. The wear measure 335 is indicative of the wear on the wind turbine, or on a component/part of the wind turbine, for example the wear on the tower, the wear on a turbine blade, the wear on a rotor bearing, the wear on a blade bearing, etc. It may be, for example, indicative of the cumulative wear experienced over the lifetime so far of the wind turbine or part/component, or indicative of the cumulative wear experienced over a particular period of time (for example, over the last month, over the last year, etc), or indicative of any other measure of wear. It may take any suitable form (for example, based on the nature of the wear and/or the part/component to which it relates), for example it may be a dimensionless number indicative of the current progress towards failure of the wind turbine or part/component, such as a number between 0-1, where 0 is indicative of no wear at the start of life and 1 is indicative of failure of the wind turbine or part/component. In this example, a wear measure of 0.8 would be indicative of wear reaching a point of 80% towards failure over the life so far of the wind turbine or part/component.

The estimate of wear may be determined in many different ways. For example, it may be based on a measurement of fatigue loading and/or an estimate of fatigue loading and/or pitch travel distance (for example, how many degrees of pitch a blade has travelled) and/or the number of times an electrical contactor has been activated (which may be particularly relevant for components of the yaw system and/or generator).

Where an estimate of fatigue loading is used to determine the wear measure, the skilled person will readily appreciate the different ways in which the load estimator 330 may determine the estimate of fatigue loading measure 335 based on the received current operational state. For example, any one of a number of fatigue approximation routines exist, such as routines based on variance determination of an oscillating signal. Also, spectral analysis methods exist. In an embodiment, the wear estimator 330 may use a rainflow count algorithm to estimate fatigue loading. This may be implemented as an online rainflow count algorithm which may continuously calculate an estimate of fatigue loading based on the rainflow count. Further details of example ways in which an estimate of fatigue loading may be determined are described in International patent application WO 2016/188532 A1, particularly between line 29, page 9, to line 20, page 11, which is hereby incorporated in its entirety by reference.

The weighting determination unit 320 is also configured to receive a reference signal which comprises a target wear. The target wear is indicative of a design or target amount of wear for the wind turbine or a part/component of the wind turbine. For example, it may be indicative of a target amount of cumulative wear for the age of the wind turbine or part/component, or indicative of a target amount of cumulative wear over a particular period of time (for example, over the last month, over the last year, etc), or indicative of any other target measure of wear. The target wear may take any suitable form, for example a number between 0-1, where 0 is representative of no wear and 1 is representative of failure. For example, a particular part/component of the wind turbine, such as a blade bearing, may have a designed lifetime of 10 years (i.e., at the time of wind turbine design, failure of the part is intended occur at 10 years of service). Therefore, when the part/component is 10 years old, its target wear would be indicative of failure (for example, '1'). When its age is less than 10 years, for example 3 years, or 6 years, or 8 years, etc, the target wear will be somewhere between 0-1. The target wear may change with time, for example increasing over time, since the part/component should experience more accumulated wear as it gets older and ages towards the end of its target life expectancy. The target wear may change with time according to any design relationship, which may be dependent on the type of part/component and/or the expected type of wear. For example, the target wear may change linearly or exponentially with time.

The target wear may be received by the controller 200 from any other module or unit, either within or outside of the control system 20, or may be stored within the controller 200, for example in a memory unit of the controller 200.

The weighting determination unit 320 is configured to determine a weighting adjustment 325 based at least in part on a difference between the target wear and the wear measure 335. Further details of the weighting adjustment 325 are explained later with reference to the MPC unit 310.

By comparing the target wear with the wear measure 335, it can be determined how the wear experienced by the wind turbine or part/component compares with the target wear. If the actual, experienced wear is lower than the target, then the wind turbine or part/component is being under-worn relative to the design target. This means that if wear continues at the same rate into the future, the wind turbine or part/component will fail later than its designed lifetime.

If the actual, experienced wear is higher than target, then the wind turbine or part/component is being over-worn relative to the design target. This means that if wear continues at the same rate into the future, the wind turbine or part/component will fail before its designed lifetime.

The MPC unit 310 is configured to determine a control signal, such as signals 26 and 28, for controlling an operation of the wind turbine, such as blade pitch and/or power extraction of the converter. The MPC unit 310 determines the control signal based at least in part on a cost function comprising a wear cost relating to one or more types of wear of the wind turbine (for example, the wear of one or more different parts/components of the wind turbine), and a corresponding cost weighting, wherein the cost weighting defines a relative weighting of the wear cost in the cost function. The cost weighting may comprise one or more values, each defining a weighting of each type of wear in the wear cost.

The skilled person will readily appreciate how MPC routines can be used to determine the control signal. However, by way of a brief explanation, MPC is a multivariable control algorithm that uses an optimization cost function J over the receding prediction horizon, to calculate the optimal control moves.

The optimization cost function may be given by:

$$J = \min(\lambda_1 * \text{Wear} - \text{Power})$$

In this example, 'Wear' is the wear cost relating to one or more types of wear of the wind turbine, for example wear of the tower and/or wear a blade bearing and/or wear of a blade, etc. Where there are two or more types of wear in 'Wear', then 'Wear' may be a vector or matrix of values. $\lambda_1$ is the cost weighting corresponding to 'Wear'. Where there are two or more types of wear in 'Wear', then $\lambda_1$ may be a matrix or vector of values such that each different type of wear in 'Wear' has a corresponding weighting value in the cost weighting. 'Power' is the electrical power output of the wind turbine. Therefore, by minimising $\lambda_1 *\text{Wear}-\text{Power}$, the cost function is optimised for achieving the best power output for particular levels of wear on the wind turbine.

It will be readily appreciated that in an equivalent implementation, an optimization benefit function may be used for exactly the same outcome. An equivalent optimization benefit function may be given by $$B = \max(\text{Power} - \lambda_1 * \text{Wear})$$

Therefore, it will be understood that the term 'cost function' as used throughout this disclosure encompasses the equivalent 'benefit function'.

The skilled person will understand that the cost function may optionally include additional terms, for example, terms relating to Noise, Pitch Rate, etc, however these are not described herein for the sake of brevity of disclosure.

The MPC unit 310 is configured to set the cost weighting, $\lambda_1$, based at least in part on the weighting adjustment 325. Changes to the cost weighting will change the weighting of the wear cost in the cost function, which should change the control signals determined by the MPC unit 310. For example, if actual wear experienced by a particular part/component during its life so far is lower than the target wear for that stage of its life, then up until now that part/component has been under-worn relative to the design target. The weighting adjustment 325 determined by the weighting determination unit 320 will reflect this and the cost weighting subsequently set by the MPC unit 310 may result in the control signals from that time onwards causing the wind turbine to be driven harder, thereby increasing the rate of further wear on the part/component. Conversely, if actual wear experienced by a particular part/component during its life so far is greater than the target wear for that stage of its life, then up until now that part/component has been over-worn relative to the design target. The weighting adjustment 325 determined by the weighting determination unit 320 will reflect this and the cost weighting subsequently set by the MPC unit 310 may result in the control signals from that time onwards causing the wind turbine to be driven less hard, thereby reducing the rate of further wear on the part/component.

The weighting adjustment may be determined based at least in part on a magnitude and/or sign (i.e., positive or negative) of the difference between the target wear and the wear measure. For example, the sign may be indicative of whether under-wearing or over-wearing is taking place. The magnitude of the difference may be indicative of how serve the under or over wearing is. By determining the weighting adjustment in consideration of the magnitude of the difference, some proportionality of changes to the weighting adjustment may be achieved, such as serve under or over wearing may result in large changes, whereas small amounts of under or over wearing may result in only small changes.

Figure 4:
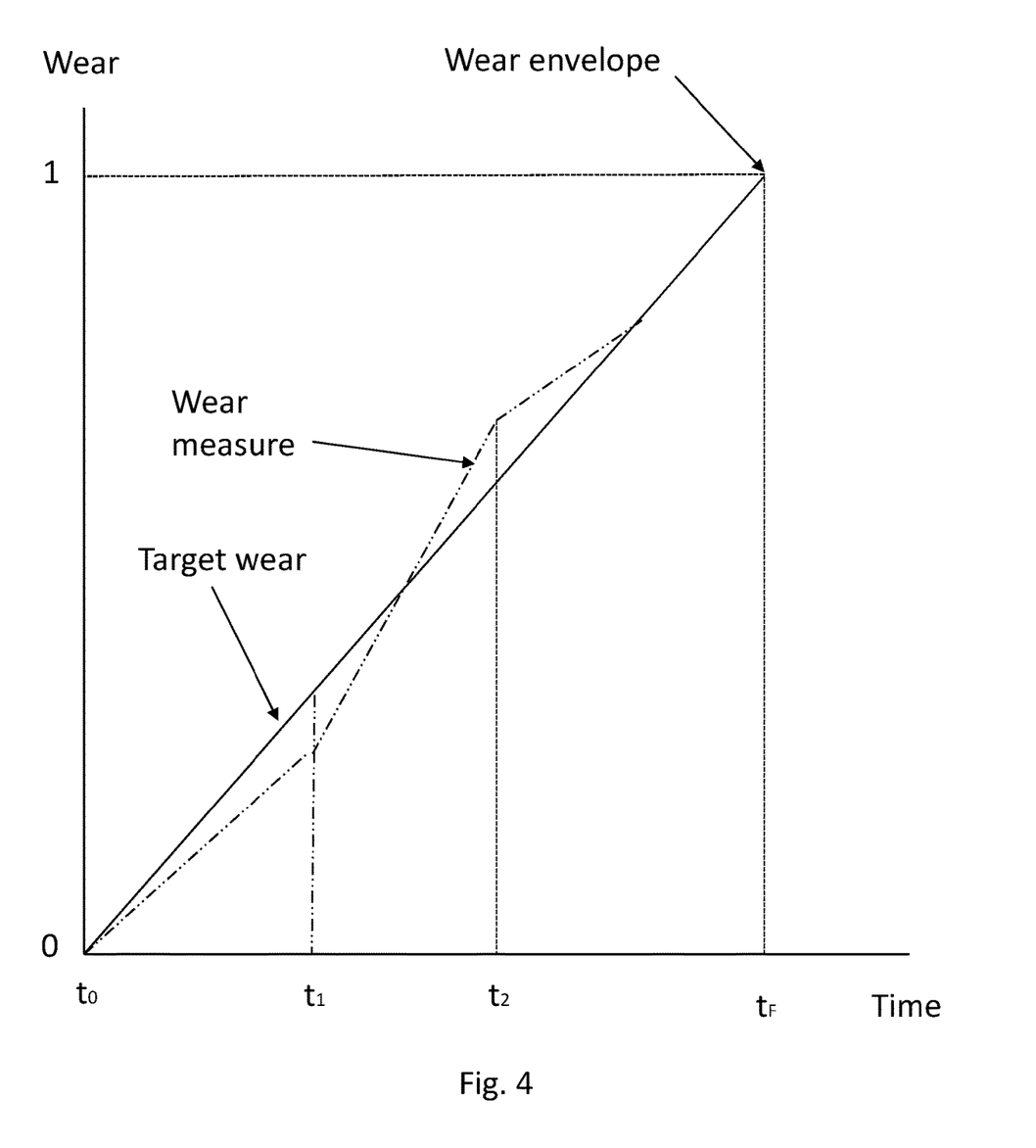
FIG. 4 illustrates an example diagram showing the controller of FIG. 3 may set the cost weighting to adjust wear of a wind turbine part/component over time.

FIG. 4 shows an example diagram to help understand how setting of the cost weighting in accordance with the present disclosure may be used to adjust wear of a part/component over time. In this particular example, a wear of '1' represents failure of the part/component. The 'wear envelope' is the level of wear at which failure is expected from the design of the part/component, and corresponds in this example to a wear of '1'. The target wear increases linearly with time (although it may alternatively change with time according to any other suitable relationship), such that a wear envelope (wear of '1', in this example) is reached at the end of the design lifetime, time $t_F$ (for example, 20 years). The wear measure at time $t_1$ (for example, 5 years) is less than the target wear at $t_1$, so the part/component has been under-worn so far. Consequently, the weighting adjustment is set in such a way that the MPC unit 310 changes the cost weighting, which causes the wind turbine to be driven harder and the rate of increase in wear on the part/component to go up. The wear measure at time $t_2$ (for example, 12 years) is now more than the target wear at $t_2$, so the part/component has now been over-worn. Consequently, the weighting adjustment is set in such a way that the MPC unit 310 changes the cost weighting, which causes the wind turbine to be driven less hard and the rate of increase in wear on the part/component to go down.

Determination of the wear measure and comparison of the wear measure against the target wear may be undertaken continuously or periodically (for example every month, or every six months, or every year), or intermittently, such that the weighting adjustment may be adjusted and refined regularly in order to achieve the optimal wear.

The inventors have recognised that failure after designed lifetime may be inconvenient, since failure may not then coincide with a scheduled service of the wind turbine. Furthermore, they have also realised that driving wind turbines harder to generate more electrical power over their lifetime may typically increase wear on some parts. Therefore, failure after the designed lifetime means that opportunities for increased power generation over the lifetime of the wind turbine may have been missed. Consequently, by recognising that the wind turbine or part/component is being under-worn, control of the wind turbine may be adjusted to bring the level of wear closer to the designed wear rate, and also to achieve greater power output over the lifetime of the wind turbine.

The inventors have also recognised that failure before the designed lifetime is undesirable, since it may cause shutdown of the wind turbine before a scheduled service, resulting in many hours, days, weeks or months without power generation. It may also result in expensive, unscheduled emergency wind turbine servicing.

Consequently, by recognising that the wind turbine or part/component is being over-worn, control of the wind turbine may be adjusted to bring the level of wear closer to the designed wear rate, thereby avoiding costly shut-downs and/or unscheduled servicing.

Figure 5:
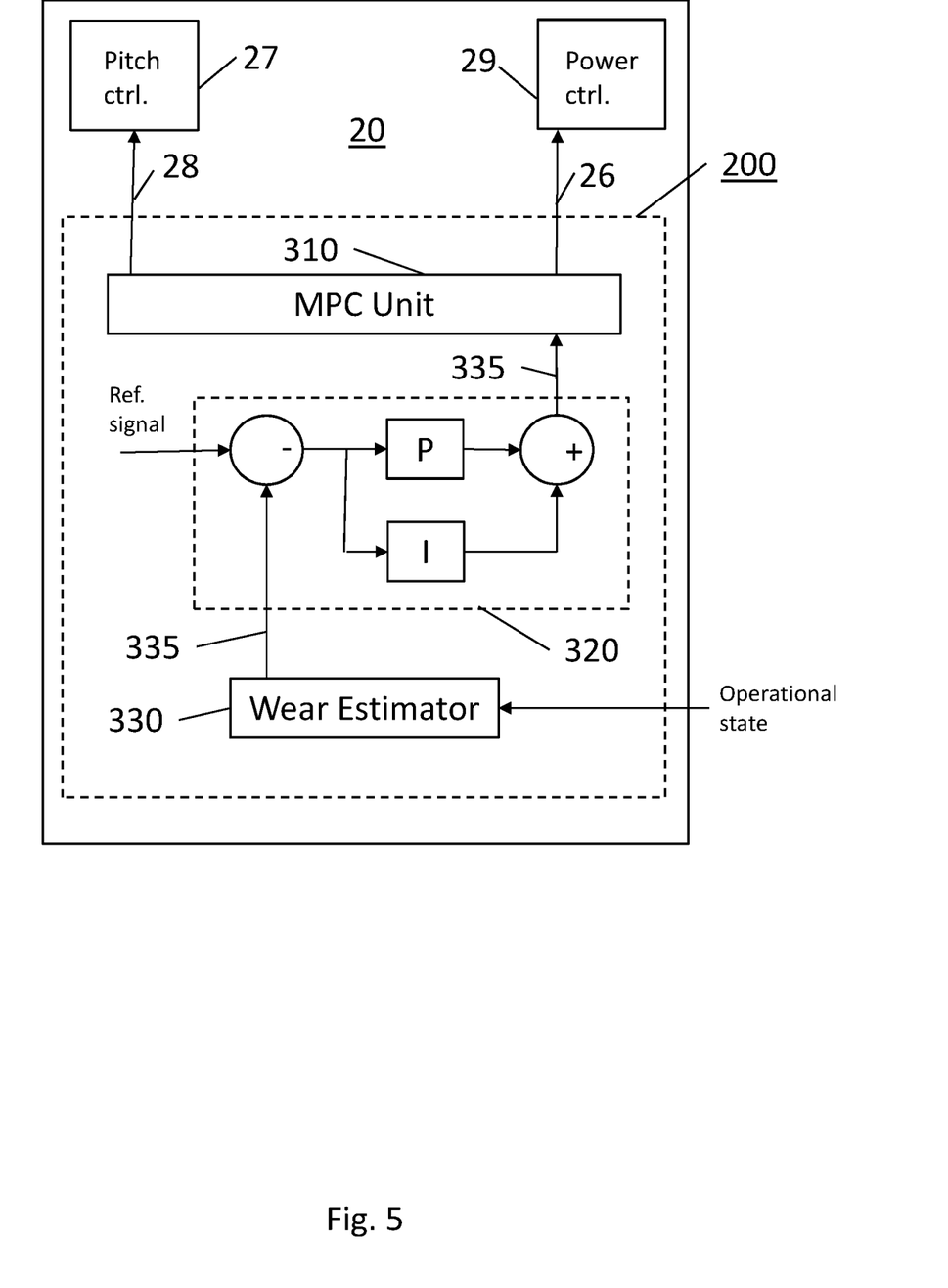
FIG. 5 illustrates details of a first example implementation of a weighting determination unit.

FIG. 5 schematically illustrates details of one example implementation of the weighting determination unit 320. The weighting determination unit 320 comprises a PI controller configured to determine the weighting adjustment based at least in part on a difference between the reference signal (target wear) and the feedback signal (the wear measure 335).

It will be appreciated that MPC cost functions are typically very complex, with a number of different interrelated terms, where adjustments to part of the function in order to achieve a desired effect on wear of one component may have (potentially undesirable) consequences on the wear of one or more other components. Consequently, in some implementations, two or more wear measures may be taken into consideration when determining the weighting adjustment.

In a first such implementation, the weighting determination unit 320 may be configured to determine the weighting adjustment based at least in part on a difference between a ratio of a first wear measure (indicative of wear of a first part/component, such as the tower) and a second wear measure (indicative of wear of a second part/component, such as blade bearings) and a ratio of a first target wear (corresponding to the first part/component) and a second target wear (corresponding to the second part/component). By considering ratios in this way, the inter-relationship between wear of the two parts/components can be taken into account when determining the weighting adjustment, which in turn affects the way in which the cost weighting in the MPC may be set. The ratios may be determined within the weighting determination unit 320, or the reference signal may comprise a ratio of two target wears and/or the wear measure may comprise a ratio of two measures of wear.

Figure 6:
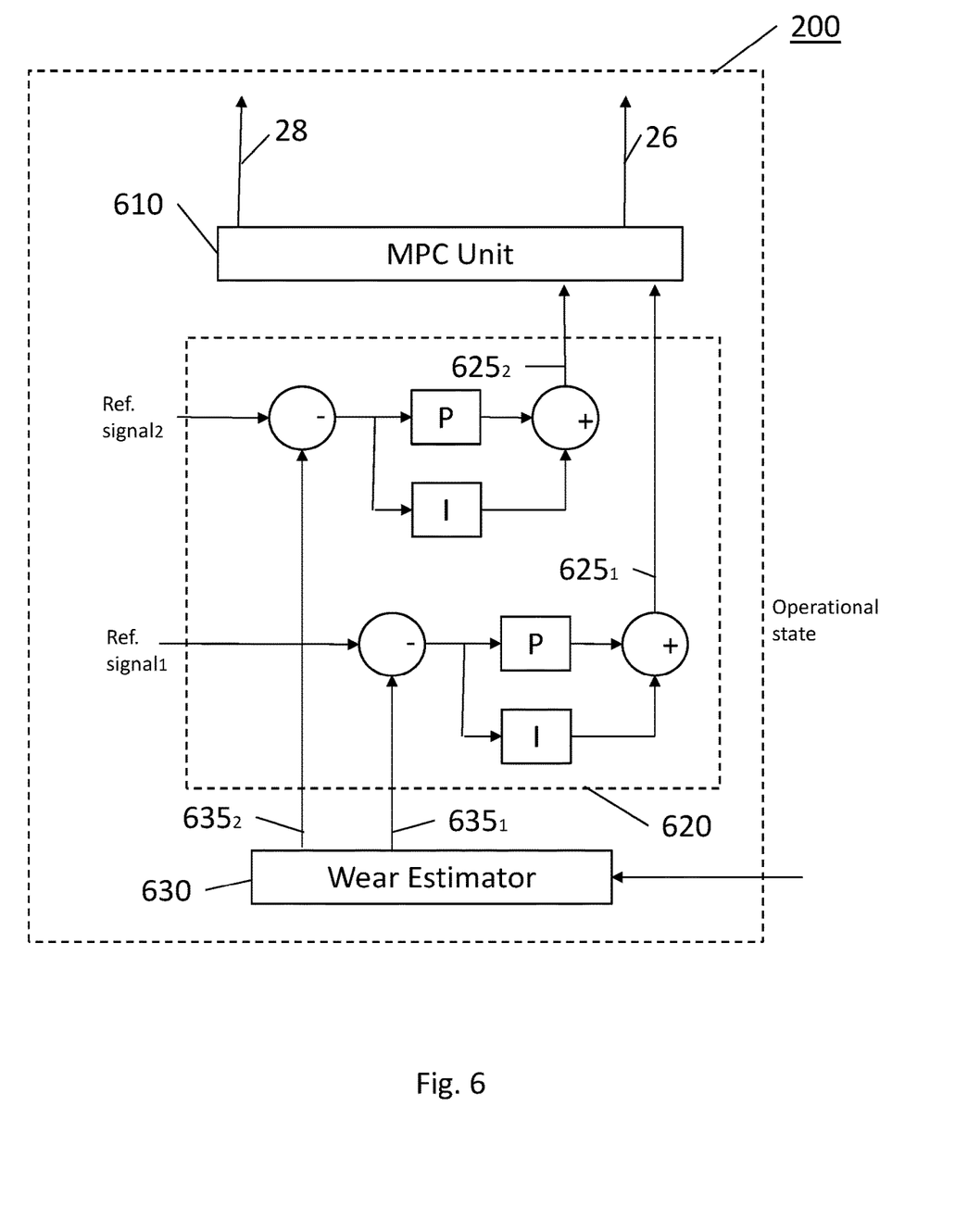
FIG. 6 illustrates details of a second example implementation of a weighting determination unit.

FIG. 6 schematically illustrates details of a second implementation of a weighting determination unit 620 that takes two wear measures into consideration. The weighting determination unit 620 receives a first wear measure $635_1$ and a second wear measure $635_2$ from the wear estimator 630. Each of these relate to a different part/component of the wind turbine. The weighting determination unit 620 also receives a first reference signal, Ref. signal$_1$, comprising a first target wear (which relates to the same part/component as the first wear measure $635_1$) and a second reference signal, Ref. signal$_2$, comprising a second target wear (which relates to the same part/component as the second wear measure $635_2$). The weighting determination unit 620 comprises two PI controllers, one for each of the wear measures. The weighting adjustment comprises two parts, $625_1$ and $625_2$, and the MPC unit 610 is configured to set the cost weighting based at least on both of these two parts. In this way, weighting adjustments relating to two different parts/components may be considered by the MPC unit 610 when setting the cost weighting. This means that if there are competing objectives between the wear of the two components (for example, it may be desired to increase rate of wear on both components, but because of the nature of the components an increase in the rate of wear on one will result in a decrease in the rate of wear of the other), those competing objectives may be taken into consideration by the MPC unit 310 and the cost weighting may be optimally set in view of that.

It will be appreciated that whilst FIG. 6 shows only two different wear measures and corresponding target wears, any number of wear measures and corresponding target wears may be considered (such as three, four, etc) by increasing the number of PI controllers.

In one example implementation, the cost function of the MPC unit may comprise one or more constraints for the cost weighting and/or a power output of the wind turbine.

For example, it may have a maximum and/or minimum allowable power output of the wind turbine. Additionally or alternatively, it may have maximum and/or minimum allowable values for at least one of the weighting values in the cost weighting. In this way, the wind turbine operation may be kept within acceptable limits, for example ensuring that a minimum acceptable level of power output is always maintained, or a maximum safe level of power output is not exceeded, etc. The MPC unit may be configured not to exceed those constraints when setting the cost weighting. Optionally, when a constraint is reached during setting of the cost weighting, the MPC unit may be configured to output a constraint notification to a monitoring entity, wherein the constraint notification is indicative of at least one of the one or more constraints being reached. The monitoring entity may be, for example, an owner or operator of the wind turbine, who may have the option to adjust one or more of the constraints, or adjust the design lifetime of one or more parts/components of the wind turbine (effectively moving the wear envelope to left or right on the diagram represented in FIG. 4, such that it is designed to be reached earlier or later than). For example, in order to reduce the rate of wear on a particular component, it may be necessary to reduce power output to a level that would be below the minimum power output constraint. By receiving a constraint notification, the monitoring entity may accept that they will need to replace that part/component earlier than expected in order to increase power output to more desirable levels. Consequently, they may choose to shorten the design lifetime of that part/component, which in turn will change the target wear for that part/component and, therefore, also change the weighting adjustment determined by the weighting determination unit. Thus, it can be seen that the use of a constraint notification can increase the flexibility of control and operation of the wind turbine to help achieve complex operational goals.

Figure 7:
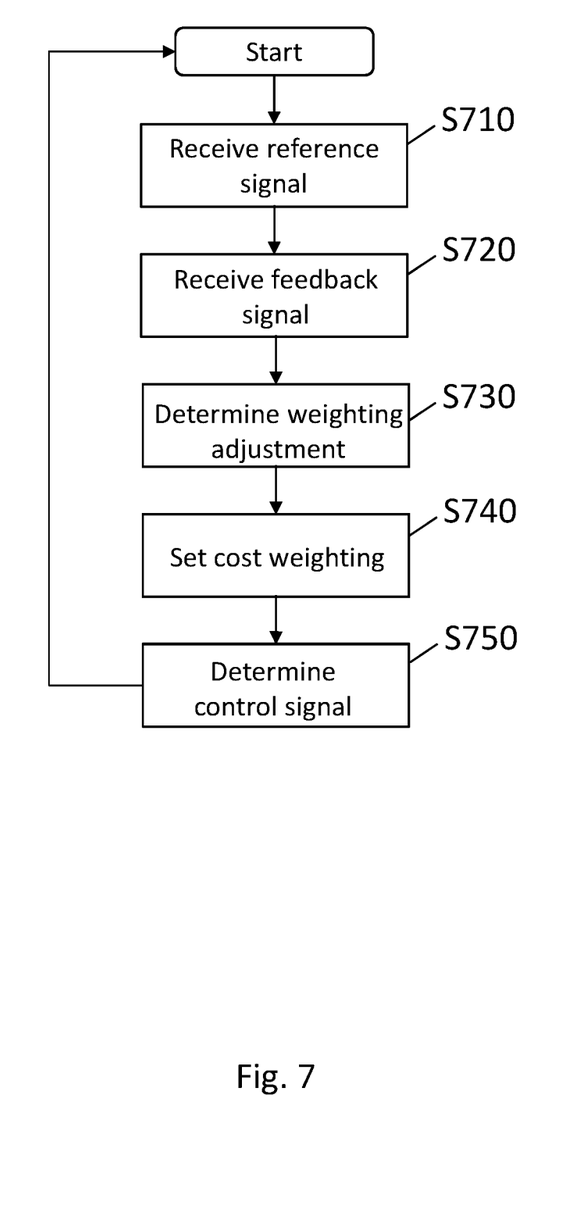
FIG. 7 illustrates a flow diagram of elements of the present disclosure.

FIG. 7 illustrates elements of a method of controlling a wind turbine to perform various embodiments of the present disclosure. The elements of the method may be implemented by software as a computer program product, hardware or a combination of software and hardware. The software may comprise computer readable code, which when executed on the processor of any electronic device, performs the functionality of the elements represented in FIG. 7. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. Typically, the software is stored by and executed by a wind turbine control system.

In Step S710, a reference signal comprising a target wear is received and in Step S720, a feedback signal comprising a wear measure is received (for example, the wear measure 335 output from the wear estimator 330).

In Step 730, the weighting adjustment is determined, based at least in part on a difference between the target wear and the wear measure.

In Step S740, the cost weighting in the cost function of the MPC routine is set based at least in part on the weighting adjustment.

In Step 750, a control signal for controlling an operation of the wind turbine is determined using the MPC routine. The control signal may be used in the controlling of, for example, blade pitch and/or power extraction of the converter, and/or any other functions or actuators of the wind turbine. The method then returns to the start and may be run again, either in a continuous loop or intermittently (for example, the method may be re-run periodically, such as every month, or every 6 months, or every year, etc).

Although the invention has been described above with reference to one or more preferred embodiments, it will be appreciated that various changes or modifications may be made without departing from the scope of the invention as defined in the appended claims.

For example, the wear measure may not be an estimate of wear determined by the wear estimator. It may alternatively be any other measure of wear, for example a direct measurement of wear made by one or more sensors on the wind turbine.

Furthermore, whilst in the above, target wear typically increases with time (since as the wind turbine or part/component ages, it is expected to experience more cumulative wear), in an alternative the target wear may decrease. For example, the target wear may be indicative of remaining designed lifetime, in which case it would decrease with time. In this example, the wear measure may be indicative of the amount of remaining life for wind turbine or part/component given the amount of wear already experienced, such that a comparison of the remaining designed lifetime and the estimated actual remaining lifetime is indicative of whether the wind turbine or part/component has been under-worn or over-worn so far.

The invention claimed is:

1. A control system for a wind turbine, the control system comprising:
    a memory; and
    a processor communicatively coupled to the memory, the processor configured to:
        determine, using model predictive control and based at least in part on a cost function and a corresponding cost weighting, a control signal for controlling an operation of the wind turbine, wherein the cost function comprises a wear cost relating to one or more types of wear of the wind turbine, and wherein the corresponding cost weighting defines a relative weighting of the wear cost in the cost function;
        receive a reference signal comprising a first target wear;
        receive a feedback signal comprising a first wear measure of the wind turbine;
        determine, based at least in part on a difference between the first target wear and the first wear measure, a weighting adjustment for at least part of the corresponding cost weighting of the cost function;
        set the corresponding cost weighting based at least in part on the weighting adjustment; and
        operate the wind turbine using the control signal determined based at least in part on the cost function and the corresponding cost weighting.

2. The control system of claim 1, wherein the processor is configured to determine the weighting adjustment based at least in part on a magnitude or a sign of the difference between the first target wear and the first wear measure.

3. The control system of claim 1, wherein the processor is further configured to determine the weighting adjustment based at least in part on a difference between a second wear measure and a second target wear.

4. The control system of claim 3, wherein the processor is further configured to determine the weighting adjustment based at least in part on a difference between:
    a ratio of the first wear measure and the second wear measure; and
    a ratio of the first target wear and the second target wear.

5. The control system of claim 1, wherein the processor comprises at least one proportional integral controller configured to determine the weighting adjustment based at least in part on a difference between the first target wear and the first wear measure.

6. The control system of claim 1, wherein the first wear measure is based at least in part on an operational state of the wind turbine.

7. The control system of claim 6, wherein the first wear measure is based at least in part on at least one estimated wear measure of the wind turbine, and wherein the processor is further configured to:
    receive a current operational state of the wind turbine; and
    generate the first wear measure based at least in part on the current operational state.

8. The control system of claim 1, wherein the first wear measure indicates a cumulative measure of wear of at least part of the wind turbine.

9. The control system of claim 1, wherein the processor is further configured to determine the control signal by optimizing the cost function.

10. The control system of claim 9, wherein the cost function comprises one or more constraints for the corresponding cost weighting or for a power output of the wind turbine.

11. The control system of claim 10, wherein the processor is further configured to:
    output a constraint notification to a monitoring entity, wherein the constraint notification is indicative of at least one of the one or more constraints being reached.

12. The control system of claim 1, wherein the first target wear changes with respect to time.

13. A wind turbine, comprising:
    a tower;
    a nacelle disposed on the tower;
    a rotor extending from the nacelle and having a plurality of blades disposed at a distal end thereof;
    a control system comprising a processor configured to:
        determine, using model predictive control and based at least in part on a cost function and a corresponding cost weighting, a control signal for controlling an operation of the wind turbine, wherein the cost function comprises a wear cost relating to one or more types of wear of the wind turbine, and wherein the corresponding cost weighting defines a relative weighting of the wear cost in the cost function;

receive a reference signal comprising a target wear;

receive a feedback signal comprising a wear measure of the wind turbine;

determine, based at least in part on a difference between the target wear and the wear measure, a weighting adjustment for at least part of the corresponding cost weighting of the cost function;

set the corresponding cost weighting based at least in part on the weighting adjustment; and operate the wind turbine using the control signal determined based at least in part on the cost function and the corresponding cost weighting.

14. A method of controlling an operation of a wind turbine, the method comprising:

receiving a reference signal comprising a target wear;

receiving a feedback signal comprising a wear measure of the wind turbine;

determining, based at least in part on a difference between the target wear and the wear measure, a weighting adjustment for at least part of a cost weighting of a cost function of a model predictive control, MPC, routine;

setting the cost weighting in the cost function of the MPC routine based at least in part on the weighting adjustment;

determining, using the MPC routine, a control signal for controlling the operation of the wind turbine, wherein the MPC routine is configured to determine the control signal based at least in part on the cost function comprising the cost weighting and a corresponding wear cost relating to one or more types of wear of the wind turbine, wherein the cost weighting defines a relative weighting of the corresponding wear cost in the cost function; and operating the wind turbine using the control signal.

* * * * *